United States Patent [19]
Gross

[11] 3,846,899
[45] Nov. 12, 1974

[54] A METHOD OF CONSTRUCTING A LABYRINTH SEAL

[75] Inventor: Donald F. Gross, Cincinnati, Ohio

[73] Assignee: General Electric Company, Cincinnati, Ohio

[22] Filed: Jan. 30, 1974

[21] Appl. No.: 438,031

Related U.S. Application Data

[62] Division of Ser. No. 276,076, July 28, 1972, abandoned.

[52] U.S. Cl.................... 29/401, 29/460, 277/53, 415/172 A, 415/174
[51] Int. Cl.............................................. B23p 7/00
[58] Field of Search........... 277/51, 52, 53; 29/401, 29/460, 527.2, 426; 415/172 A, 174

[56] References Cited
UNITED STATES PATENTS

| | | | |
|---|---|---|---|
| 2,963,307 | 12/1960 | Bobo | 415/174 UX |
| 3,046,648 | 7/1962 | Kelly | 415/174 UX |
| 3,423,070 | 1/1969 | Corrigan | 277/53 X |
| 3,639,215 | 2/1972 | VanSciver et al. | 29/460 X |
| 3,694,882 | 10/1972 | Desmond | 277/53 X |
| 3,771,798 | 11/1973 | McDonald et al. | 29/401 X |

FOREIGN PATENTS OR APPLICATIONS

| | | | |
|---|---|---|---|
| 113,904 | 3/1929 | Austria | 277/53 |
| 170,550 | 7/1934 | Switzerland | 277/53 |
| 671,871 | 5/1952 | Great Britain | 277/53 |

*Primary Examiner*—Charles W. Lanham
*Assistant Examiner*—D. C. Reiley, III
*Attorney, Agent, or Firm*—Derek P. Lawrence; Lee H. Sachs

[57] ABSTRACT

A labyrinth seal of the variety used with a rotatable shaft and a coaxial shroud spaced from the shaft is provided with replaceable tooth segments. In one form, the segments are disposed within a groove circumscribing the shaft, the groove having an overhanging shoulder, and the base portions of the tooth segments partially underlying the shoulder. A retaining metal deposit is applied to the base portions within the groove. Replacement of tooth segments is accomplished by removing the retaining metal deposit, removing worn tooth segments and replacing them with new tooth segments.

5 Claims, 3 Drawing Figures

PATENTED NOV 12 1974
3,846,899
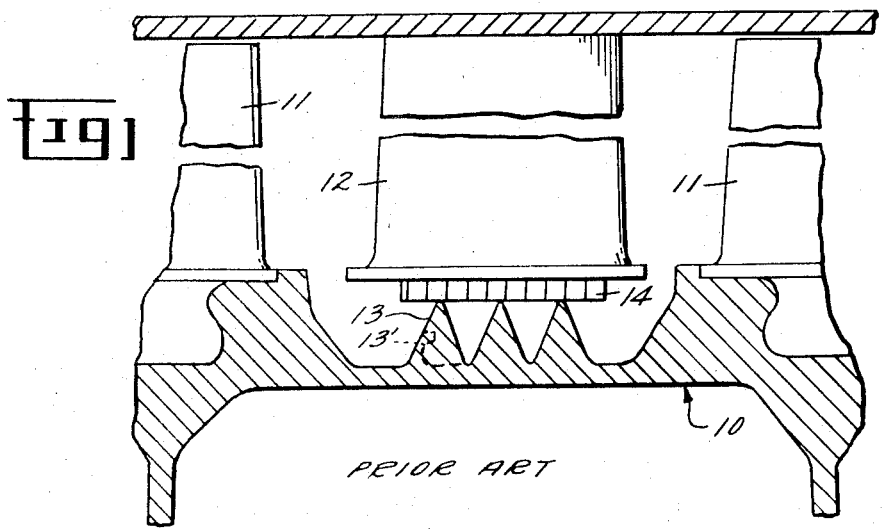
Fig 1
PRIOR ART
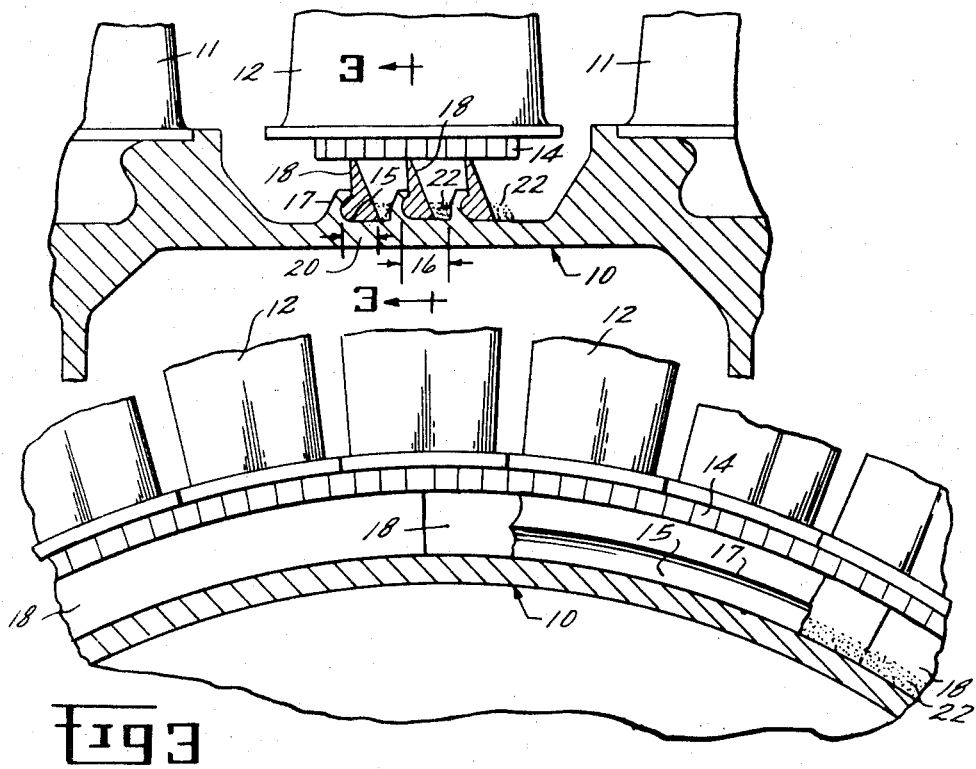
Fig 2
Fig 3

A METHOD OF CONSTRUCTING A LABYRINTH SEAL

This is a division of application Ser. No. 276,076, filed July 28, 1972, now abandoned.

BACKGROUND OF THE INVENTION

This invention relates to the formation of labyrinth seals and, more particularly, to replaceable teeth therefor. The invention herein described was made in the course of or under a contract, or a subcontract thereunder, with the United States Department of the Air Force.

Gas turbine engines, and similar rotating machinery wherein pressurized fluids flow, depend for their efficiency, in part, upon effective seals between static and rotating elements for the purpose of maintaining desired fluid pressures. An effective seal for disposition between rotatable shafts and encircling shrouds has been found to be provided by the labyrinth variety of seal. One form of labyrinth seal incorporates a plurality of radially extending teeth disposed about the circumference of the rotatable shaft and extending radially into proximity with the shroud. Pressure differentials within the spaces between adjacent seal teeth serve to prevent leakage of fluid axially along the shaft and, hence, provide an effective seal.

One problem with respect to labyrinth seals is the fact that the seal teeth tend to wear and become inefficient in the tip area where the teeth approach, and sometimes engage, the shroud. Therefore, it is beneficial to provide labyrinth seal structure which may easily be repaired in the event of such damage.

Prior art labyrinth seals for use in gas turbine engines have incorporated seal teeth with the associated shaft in a unitized construction. Thus, when it became necessary to replace the teeth, the shaft also had to be replaced. Since such shafts represent very substantial investments, it is desirable to devise a way to replace labyrinth seal teeth while salvaging and reusing the associated shaft. The present invention provides method and means for replacing present unitized teeth with replaceable teeth, as well as for forming new shaft and shroud and similar combinations having replaceable seal teeth associated therewith.

SUMMARY OF THE INVENTION

It is therefore an object of the present invention to provide an improved, efficient labyrinth seal.

It is a more particular object of the present invention to provide a labyrinth seal having replaceable seal teeth.

It is a further object of the present invention to provide a labyrinth seal with replaceable seal teeth held in position upon a reusable rotatable shaft by means of replaceable retaining means.

It is another object of the present invention to provide an efficient method for fabricating labyrinth seals, which method permits repeated utilization of associated shaft structure.

It is still a further object of the present invention to provide an efficient method for removing damaged or worn seal teeth and replacing them with new ones.

In order to accomplish the foregoing as well as further objects which will become apparent hereinafter, the present invention, in one form thereof, provides a labyrinth seal (for cooperation with a rotatable shaft and an encircling shroud or between any two relatively rotating members) and includes a plurality of adjacent grooves defined in the circumference of and substantially circumscribing the rotatable shaft. Each groove has an overhanging shoulder (which may comprise the remainder of a conventional tooth subjected to proper machining) at one of its sides and a predetermined width. Disposed within each groove is a plurality of circumferentially abutting tooth segments having bases of a predetermined width smaller than the width of the grooves. The segments are mounted within the groove with their bases partially underlying the overhanging shoulders, and a retaining metal deposit such as thermally sprayed or brazed metal, etc. is disposed upon the bases and within the remaining groove width. Replacement of tooth segments is accomplished by removing the retaining deposit from the bases of the segments, removing damaged segments, substituting new segments and redepositing a retaining metal deposit over the bases of the new segments.

BRIEF DESCRIPTION OF THE DRAWING

The concepts disclosed in the foregoing brief summary will be further elucidated by the following description of a preferred embodiment of the present invention, taken in conjunction with the appended drawings, wherein:

FIG. 1 is a section view of a prior art labyrinth seal illustrating the applicability of the present invention thereto;

FIG. 2 is a section view of a labyrinth seal according to the present invention in cooperation with a rotatable shaft and an encircling shroud; and FIG. 3 is a view of the seal of FIG. 1 taken along the line 3—3.

DESCRIPTION OF A PREFERRED EMBODIMENT

Referring to FIG. 1, a prior art labyrinth seal configuration is depicted, wherein shaft 10, a compressor rotor or similar rotatable element, is a rotatable gas turbine engine compressor drum or other fluid machinery element. Shaft 10 supports a plurality of compressor blades 11 which, in cooperation with stator blades 12, serve to compress a fluid flow. In one form of such a configuration, a shroud 14 cooperates with stator blades 12 and encircles shaft 10 for the purpose of forming a seal therewith. (Clearly, a similar apparatus might involve two coaxial relatively rotating shafts, or some other combination requiring a fluid seal.) In order to complete the seal, a plurality of adjacent seal teeth 13 substantially circumscribe shaft 10 and extend radially into proximity with shroud 14. (Variations of labyrinth seals are known wherein opposed sets of teeth intersperse one another, as well as wherein the teeth are supported by a fixed member encircling a shrouded rotatable shaft.) As shown, prior art seal teeth are formed as a unit with shaft 10, and when worn, are replaceable only by replacement of the associated shaft. This becomes an expensive proposition.

The present invention presents both a method and structure for obviating the necessity of shaft replacement with seal tooth replacement. The present invention can be utilized both with present shaft-tooth combinations (by means of appropriate adjustment to the structure thereof) as well as in place of present combinations as original equipment.

Referring to FIGS. 2 and 3, one form of labyrinth seal configuration according to the present invention is disclosed in the environment of a gas turbine engine. It will be appreciated, however, that the concepts of the present invention can be applied in any situation wherein a labyrinth seal having substantial mechanical strength is to be subjected to conditions conducive to wear or damage thereto and the requirement of replacement of particular tooth elements. With the exception of designated elements, the structure of FIGS. 2 and 3 is the same as that of FIG. 1, and like elements retain like numerals.

As above, rotatable shaft 10, supporting a plurality of compressor blades 11, is shown to cooperate with an encircling shroud 14 supported by a plurality of compressor stator blades 12 mounted upon a fixed engine casing. Shroud 14 may be formed of honeycomb material or any other material exhibiting suitable characteristics for the application involved. Commonly, such shrouds in gas turbine engines are formed of a material conducive to abrasion by mating elements for the purpose of ensuring a satisfactory seal.

Shaft 10 is provided with a plurality of grooves 15 substantially encircling the drum structure and substantially parallel with one another. Each groove 15 has a predetermined width 16 and a locator member, in this embodiment comprising an overhanging shoulder 17 defining one of its walls. The overhanging shoulders 17 depicted in FIG. 2 are of generally C-shaped configuration in the cross section; however, any overhanging or undercut shoulder wherein an upper portion of the shoulder overlies a portion of the associated groove will suffice.

Disposed within each groove 15 is a row of labyrinth seal teeth comprising a plurality of abutting tooth segments 18. The tooth segments have thickened base portions 20, also of generally C-shaped cross section, disposed within the grooves; and the tooth segments extend therefrom radially outwardly from the shaft and into proximity with the shroud 14. The base portions of the tooth segments have predetermined widths smaller than width 16 of the grooves 15. According to an object of the present invention, the tooth segments are disposed within grooves 15 with the base portions partially underlying these shoulders for the purpose of securing the tooth segments against the high centrifugal forces associated with rapid rotation of shaft 10. The cross-sectional shape of the base portion 20 of the tooth segments 18 preferably conforms to that of the associated shoulders 17; however, any enlarged base configuration suitable to partially underlie the shoulders is acceptable.

Upon disposition of tooth segments 18 within groove 15 and into cooperation with shoulder 17, composite seal teeth result, each formed partially of the material of shaft 10 and partially of tooth segments 18. (It is to be noted at this point that considerable variation of the present embodiment may be made without departing from the basic principles illustrated herein. For example, the formation of the locator members may be varied from the overhanging shoulders 17 and may involve radial ribs projecting outward from the shaft upon which tooth segments having indented bases are mounted. Any such combination will result in replaceable composite seal teeth and be satisfactory. Further variation may involve total elimination of grooves 15 and disposition of the tooth segments directly upon the undeformed surface of shaft 10 in cooperation with suitable locator members. The present embodiment, then, is by no means intended to illustrate the only workable form of this invention.)

For the purpose of retaining the plurality of tooth segments 18 in proper position within groove 15 during operation of the rotatable shaft, a retaining body of deposited metal 22 is disposed over a portion of the bases 20 of the tooth segments, the deposit substantially filling the remaining width of the grooves not filled by the tooth segment bases 20. The deposit 22 may be formed by thermal spraying or brazing or by other means. During shaft rotation, transverse components of the centrifugal forces of rotation are counteracted by shear forces between the retaining deposit 22 and the bottom of the grooves 15 as well as by compressive forces between the deposit 22 and the associated opposed shoulder forming the opposite side of each groove. Hence, the deposit 22, in conjunction with the overhanging shoulder 17, serves to retain tooth segments 18 within associated grooves 15 despite substantial forces associated with operation of the engine.

According to a major object of the present invention, the concept and structure thereof is adaptable to use as original equipment upon specially designed shafts such as that shown in FIGS. 2 and 3, or in conjunction with the prior art structure of FIG. 1. Pursuant to the latter, FIG. 1 discloses a phantom illustration 13' of a groove (similar to grooves 15 in FIG. 2) which may be cut into the shaft structure 10 by machining away the metal forming tooth 13. Subsequently, a plurality of seal tooth segments 18 may be positioned and retained therein as described above in conjunction with FIGS. 2 and 3. This procedure may be used to replace the whole or a part of a single worn tooth or any number of the teeth 13 of the prior art seal of FIG. 1.

According to another object of the present invention, a method for forming labyrinth seal disclosed hereinbefore is provided. One form of the method may be described in conjunction with FIGS. 2 and 3, and includes the preferred steps of defining a plurality of substantially parallel grooves substantially circumscribing shaft 10, the grooves designated 15; positioning within the groove a plurality of abutting and radially extending tooth segments 18 having base portions 20 thereof adapted to reside within the grooves; and disposing a retaining deposit of metal over the bases within the grooves by means of brazing, thermal spraying or similar method. Additional steps may include forming an overhanging shoulder 17 along one edge of groove 15 and disposing the base portions 20 of the tooth segments 18 in a position partially underlying the overhanging shoulder 17. The rows of labyrinth seal teeth are subsequently brought into cooperation with an encircling shroud 14. In this fashion, the reliable and effective labyrinth seal of the present invention may be formed, and may be applied to prior art seal structures in addition to those specially constructed under these principles.

Alternatives to this method applicable to the varied forms of the labyrinth seal of the present invention discussed above can include the steps of: forming locator members upon the associated shaft (analogous to shoulders 17); positioning a tooth segment in cooperation with a locator member; and disposing a retaining deposit upon the base of the tooth segment.

As has been stated hereinbefore, the possible engagement of shroud 14 by tooth segments 18 over extended periods of operation may tend to damage or wear these tooth segments. Maintenance of desired efficiency of an engine requires that seals which have become ineffective due to such wear and damage be replaced or repaired. The present invention provides a simplified method for replacing individual tooth segments when desired. This method includes the steps of removing the retaining metal deposit from the base portions of the worn tooth segment; removing the worn segment from the groove 15; positioning a new tooth segment 18 within the groove; and re-depositing a retaining deposit of metal over the base of the new segment within the groove. While it is presently contemplated that sufficient of the original retaining metal be machined from the tooth base to allow removal of the tooth, it is apparent that any localized means for removing metal will suffice.

With the labyrinth seal according to the described embodiment of the present invention in place between shaft 10 and shroud 14, the operation of the device may be illustrated as follows: rotor shaft 10 and associated rotor blades 11 are put into rapid rotation by means well known in the art. Stator blades 12 remain fixed to the casing with shroud 14 supported thereby. As the rotational velocity of shaft 10 increases, centrifugal forces acting upon individual tooth segments 18 increase with resulting radial and transverse components of force being resisted by the overhanging shoulder 17 in combination with the metal deposit 22 disposed within grooves 15 and upon bases 20 of the tooth segments. Thermal and mechanical stresses may operate to bring the radially outward edges of tooth segments 18 into engagement with shroud 14 and cause mutual wear therebetween. This action results in the worn or damaged tooth segments which must be replaced in order to maintain an efficient seal between shaft 10 and shroud 14. It is to this end that the present invention is particularly adapted.

It is clear that those skilled in the art will be able to conceive variations of the structure of the labyrinth seal of the present invention without departing materially from the scope of the concept of this invention. For example, in applications involving reduced centrifugal forces, it may be practicable to construct seals not including the overhanging shoulders 17 but simply disposing teeth segments within grooves 15 and depositing retaining metal over the bases thereof. On the other hand, should the overhanging shoulder be retained, it is clear that it may be modified in form so long as its basic character remains. Additionally, the cross-sectional configuration of the base portions 20 of tooth segments 18 may be modified to any desired effective shape, for cooperation with the associated overhanging shoulder. Furthermore, as stated above, locator members other than the shoulders 17 may be used with or without grooves 15 in combination with seal tooth segments having indented or otherwise cooperating bases. Variations such as these and others, which will be obvious to those skilled in the art, may be made which do not depart materially from the scope of the present invention, and these are intended to be covered by the appended claims.

What is claimed as new and desired to be secured by Letters Patent of the United States is:

1. A method for constructing a labyrinth seal between relatively rotating members, said method comprising the steps of:
   positioning a tooth segment having a base portion in cooperation with a first of said relatively rotating members; and
   disposing a retaining deposit upon said base portion for securing said tooth segment upon said first member.

2. The method of claim 1 further including the steps of:
   forming a locator member upon said first member; and
   bringing said base portion of said tooth segment into cooperation with said locator member.

3. A method for constructing a labyrinth seal between a rotatable shaft and an encircling shroud coaxial with and spaced from the shaft, said method comprising the steps of:
   defining a groove substantially circumscribing the shaft;
   positioning within said groove a plurality of radially extending tooth segments having base portions; and
   disposing a retaining deposit over said base portions within said groove.

4. The method of claim 3 wherein:
   said defining of the groove in the shaft includes forming an overhanging shoulder along one edge of the groove; and
   said positioning of said tooth segments within said groove includes disposing the base portions of said segments in a position at least partially underlying said overhanging shoulder.

5. A method for replacing a worn tooth segment of a labyrinth seal wherein the segment has disposed upon its base a retaining deposit, said method comprising the steps of:
   removing the deposit from the base portion of said worn tooth segment;
   removing said worn segment;
   positioning a new tooth segment, including a base portion; and
   disposing a retaining deposit of metal over the base portion of said new segment.

* * * * *

PO-1050
(5/69)

UNITED STATES PATENT OFFICE
CERTIFICATE OF CORRECTION

Patent No. 3,846,899      Dated November 12, 1974

Inventor(s) Donald F. Gross

It is certified that error appears in the above-identified patent and that said Letters Patent are hereby corrected as shown below:

ON THE TITLE PAGE:

Related U. S. Application Data, line 2:

delete "abandoned".

COLUMN 1, line 5, delete "now abandoned"

Signed and sealed this 4th day of February 1975.

(SEAL)
Attest:

McCOY M. GIBSON JR.
Attesting Officer

C. MARSHALL DANN
Commissioner of Patents